United States Patent
Serroyen et al.

(10) Patent No.: US 7,333,471 B2
(45) Date of Patent: Feb. 19, 2008

(54) DEVICE FOR TRANSMITTING SIGNALING MESSAGES

(75) Inventors: Gert Serroyen, Schelle (BE); Gery Verwimp, Borgerhout (BE)

(73) Assignee: SiemenAktiengesellschaft, Munich (DE)

( * ) Notice: Subject to any disclaimer, the term of this patent is extended or adjusted under 35 U.S.C. 154(b) by 823 days.

(21) Appl. No.: 10/755,789

(22) Filed: Jan. 12, 2004

(65) Prior Publication Data

US 2004/0174859 A1 Sep. 9, 2004

Related U.S. Application Data

(63) Continuation of application No. PCT/DE02/01946, filed on May 27, 2002.

(30) Foreign Application Priority Data

Jul. 13, 2001 (DE) ................................. 101 34 096

(51) Int. Cl.
*H04L 12/28* (2006.01)

(52) U.S. Cl. ...................................... 370/351; 370/466

(58) Field of Classification Search ................ 370/351, 370/352, 353, 354, 355, 410, 467, 392, 394, 370/395.1, 393, 400, 464, 466, 469, 474, 370/471; 709/249, 227

See application file for complete search history.

(56) References Cited

U.S. PATENT DOCUMENTS

| 5,706,286 A | 1/1998 | Reiman et al. |
| 6,400,958 B1 * | 6/2002 | Isomursu et al. ........... 455/466 |
| 7,002,988 B1 * | 2/2006 | Benedyk et al. ............ 370/467 |

FOREIGN PATENT DOCUMENTS

| WO | WO 00 19739 | 4/2000 |
| WO | WO 00 76134 A1 | 12/2000 |

* cited by examiner

*Primary Examiner*—Chi Pham
*Assistant Examiner*—Alexander O. Boakye
(74) *Attorney, Agent, or Firm*—Bell, Boyd & Lloyd

(57) ABSTRACT

The invention relates to a transmission device for transmitting signaling messages from a signaling system, comprising a receiving interface (2) for receiving signaling messages, a plurality of processing devices (4a 4n) for processing the signaling messages received, and a decision device (3) which selects a processing device (4a 4n) for the further processing of the respective signaling message according to the source and/or user information contained in the respective signaling messages.

17 Claims, 8 Drawing Sheets

DEVICE FOR TRANSMITTING SIGNALING MESSAGES

This application is a continuation of International Application No. PCT/DE02/01946, filed May 27, 2002 and claims the benefit thereof. The international Application claims the benefits of German application No. 10134096.6 filed Jul. 13, 2001, both applications are incorporated by reference herein in their entirety.

FIELD OF THE INVENTION

The present invention relates to a transmission device for transmitting signaling messages from a signaling system.

BACKGROUND OF THE INVENTION

Signaling is taken to mean the exchange of signaling messages, for example between databases, switching nodes and terminals in a telecommunications network. A protocol for signaling is provided for example by signal system no. 7.

Signaling messages are needed for example for setting up, maintaining and releasing a telephone connection, transmitting call numbers, caller and call charge information, transmitting routing information for 0130, 0180 and 0190 numbers, extended functions such as call forwarding and conference calls, and the exchange of information between network operators on such things as the location of a mobile phone user.

The signaling network is often superimposed on the user data network, i.e. the transmission paths of the user channel in, for example, the TDM (Time Division Multiplex) method are used for physical transmission of the signaling messages; at higher levels, however, the networks are completely separate.

The signaling network contains signaling points (SP), with a distinction made between signal end points and signaling transfer points, and the transmission paths between the signaling points.

As regards the signaling end points, a distinction is made between service switching points (SSP) and service control points (SCP). A service switching point, for example, sends signaling messages to another service switching point that are needed for setting up, maintaining and releasing a telephone connection. A service switching point can also send a request to a database of a service control point in order, for example, to determine the routing information of a service call number (e.g. 0130 or 0800).

The connection between individual signaling points is handled via transmission sections, known as links. The individual signaling points are generally connected via multiple links.

The protocol structure of signaling system no. 7 consists essentially of the message transfer part (MTP) and the user parts (UP), with the message transfer part forming the transport system for the data of the user parts.

User parts for different applications include the ISUP (ISDN user part) and the TCAP (transaction capabilities application part).

The signal connection control part (SCCP) defined in the protocol structure adds certain functions to the message transfer part; typically it supports the transaction capabilities application part (TCAP).

The SCCP is used in the public switched telephone network (PSTN) and in the public land mobile telephone network (PLMN) for transporting signaling messages that are not assigned to any connection from a source to a destination, such as for database access in an intelligent network, callback on busy, mobile roaming, handover, etc.

The SCCP protocol is a protocol of signaling system no. 7 which has been standardized by the International Telecommunication Union (ITU) in Recommendations Q.711 to Q.714 and which performs some of the tasks of Layer 3 of the OSI model (Open Systems Interconnection); the SCCP protocol determines the routing of messages from a source to a destination.

For signaling messages that are not assigned to any connection, the users (user parts) of the SCCP use a general address that is globally valid, known as the global title, for identifying the destination. This global title address is a unique address within the transmission network and usually consists of a combination of digits (e.g. the dialed 0130 number or an identification number for a mobile phone user).

The general address (global title) is used by the relevant transfer node (STP) to determine further routing to the next signaling node (end node or transfer node) for translation. The general address is used by a global title translator (henceforth referred to as a processing device) for example for determining a destination (such as a further transfer node or an end node).

In accordance with prior art, the appropriate processing device that further processes the relevant signaling message performs this processing task for signaling messages according to destination information.

Routing may therefore take place on a static basis, i.e. by sending routing tables that contain the relevant destination information and very rarely change. Routing may also take place as a function of the loads on the appropriate transmission paths. In this case, routing based on the loads on the transmission paths is performed for each logical connection or for each individual signaling message.

Since the signaling network described also handles signaling for controlling user channels (e.g. telephone connections) the requirements that the signaling network has to meet in terms of quality of service (QoS), including security and real-time transmission, are high.

However this high quality of service is often not necessary for signaling messages, particularly if the signaling messages are ones that are not assigned to any connection. An example of such a message is a signaling message relating to SMS (short message service) traffic.

Signaling messages that relate to SMS traffic are transferred by the mobile application part (MAP) of signaling system no. 7. The MAP is an application part (user part) of signaling system no. 7 for signaling in mobile communication systems.

Routing for signaling messages according to prior art has the disadvantage however that all the signaling messages are transferred via the signaling network at a high quality of service. Expensive resources must therefore be provided for all types of signaling message, even if the type of message does not require this high quality of service.

Other features are linked with global title translation such as billing for the signaling and support for ported numbers, i.e. call numbers of subscribers who for example have moved house and have kept the number. Billing takes place according to the processing device used, i.e. according to the global title translator used for the relevant signaling message.

However, because the processing device is selected according to destination information, as already described, it is difficult for network operators to define different tariffs for billing different signaling messages.

SUMMARY OF THE INVENTION

The object of the present invention is therefore to propose a transmission device for transferring signaling messages of a signaling system that enables flexible processing and transmission of signaling messages.

Aspects of the present invention are achieved by a transmission device for transmitting signaling messages of a signaling system as described below in the detailed description.

The transmission device for transmitting signaling messages of a signaling system in accordance with the present invention contains a receiving interface for receiving signaling messages, a plurality of processing devices for processing the signaling messages received, and a decision device which selects a processing device for further processing the relevant signaling message according to the source information and/or user information (i.e. information from the user part) contained in the relevant signaling messages.

The advantage of this invention is that flexible routing of the relevant signaling message based for example on the requirements of this signaling message is possible. Billing can also be made more flexible, for example according to the network operator, user (user part), message type, etc.

Another advantage of this invention is that numbers can be identified as ported or non-ported on the basis of the source of the signaling messages.

Advantageous embodiments of the invention are given in the subclaims.

The decision device can select the relevant processing device based for example on the source address of the signaling message. In the protocol structure (protocol stack) of signaling system no. 7,. this source address is referred to as the origination point code (OPC) and/or the calling party address (subsystem number SSN, global title GT).

The decision device can also select the processing device on the basis of the user, with the result that different processing devices are selected for example for MAP and INAP (intelligent network application part) messages even if both messages have the same destination.

The message type may be another decision criterion. Signaling messages that relate for example to SMS data traffic that is transmitted as MAP signaling messages, can be processed differently from other MAP signaling messages.

The processing devices may differ for example in how they carry out processing in terms of signaling message routing.

Depending on the network provider, signaling messages can be routed for example in such a way that different transfer points, networks of different network operators, etc. are used for transmission.

Another possibility for routing signaling messages is that the signaling messages can be transferred via different data communications networks according to their source information or user information.

The processing devices can therefore differ in that they perform processing with regard to transmission via a first or a second data communications network.

The first data communications network may be a signaling network with a high quality of service and the second data communications network may be an IP-based data communications network (e.g. the internet) with a lower quality of service.

This invention therefore enables a data communications network to be selected on the basis of the contents of the signaling message to be transferred. Signaling messages for which there are no high requirements in terms of the quality of service of data transmission can be transferred via an appropriate data communications network (second data communications network, e.g. the internet). For many signaling messages the quality of service requirements can be derived from their contents. There is therefore no need to provide expensive resources with a high quality of service for signaling messages with certain contents.

Good examples of signaling messages that require a relatively low quality of service for the data communications network are signaling messages which relate to SMS data transfers. For these signaling messages the decision device selects a processing device that transfers signaling messages via the second data communications network.

They can also differ in the way in which they perform processing with regard to billing (charge recording) for the signaling messages, so that for example signaling messages from different network operators, users, etc. can be billed differently.

BRIEF DESCRIPTION OF THE DRAWINGS

This invention is described below in more detail with the aid of a preferred embodiment with reference to the appended drawings in which.

DETAILED DESCRIPTION OF INVENTION

Figure 1:
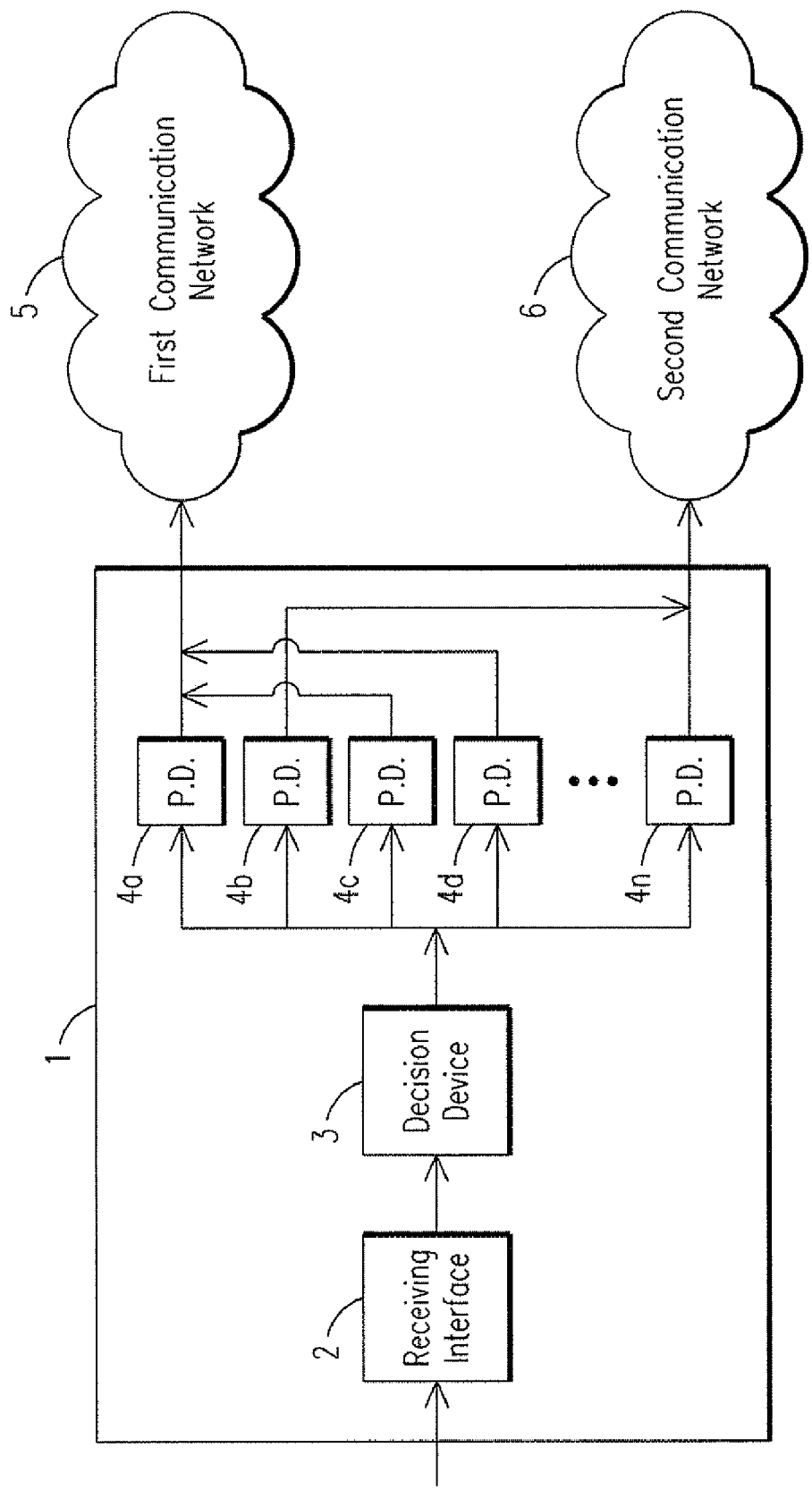
FIG. 1 shows a schematic diagram of the transmission device as per the invention.

As can be seen in FIG. 1, the transmission device 1 as per the invention contains a receiving interface 2 for receiving signaling messages, multiple processing devices 4a-4n for processing the received signaling messages, and a decision device 3 which in accordance with the present invention selects a processing device 4a-4n for further processing of the relevant signaling messages according to the source information and/or user information contained in the signaling messages.

In an embodiment of the present invention, SMS signaling messages that relate to the MAP (mobile application part) user are transferred via a (relatively inexpensive) IP data communications network (second data communications network 6) to the destination; the (expensive) TDM signaling network (first data communications network 5) is therefore relieved of SMS-related MAP signaling traffic. This frees up capacity that the network operator can make available for further signaling traffic.

Figure 2:
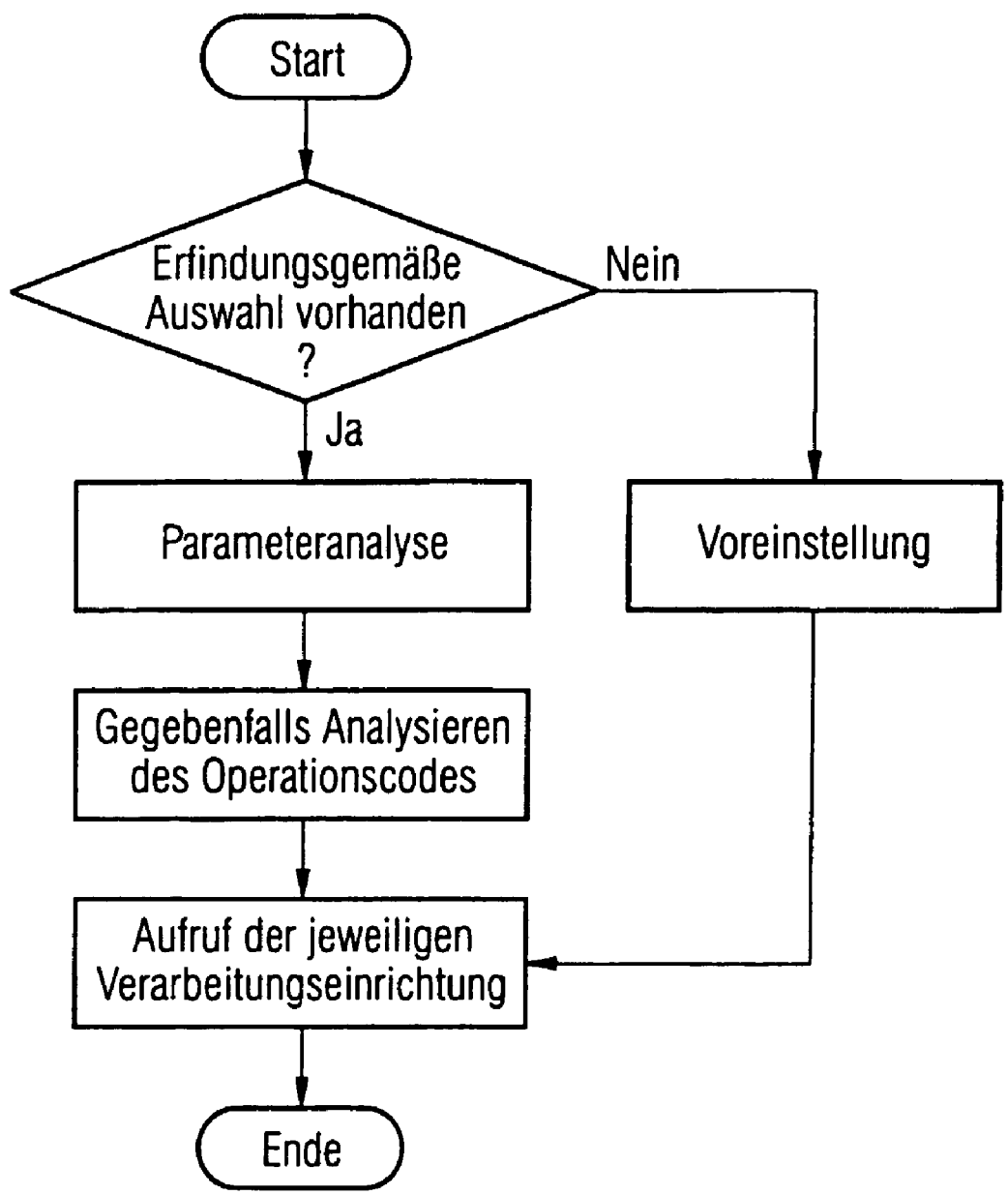
FIG. 2 shows a decision flowchart for selecting the processing device.

FIG. 2 shows a flowchart for selecting the processing device, as per the invention.

If a processing device can be selected in accordance with the present invention, certain parameters of the relevant received signaling message are first analyzed by the decision device as per the invention. If this selection option is not available, processing is performed by a processing device, i.e. selection of the relevant global title translator, by default in accordance with prior art.

The decision device as per the invention analyzes the parameters of the relevant received signaling message so that the relevant decision device can be selected. Parameter analysis can be performed for example according to the following criteria:

- Determination of the source address (originating point code) which is contained in the routing labels of signaling messages,
- Determination of the source of the SCCP signaling traffic, i.e. signaling traffic that comes from a particular SCCP node is processed accordingly, for example on the basis of list entries,
- Determination of the network number from the message transfer part, i.e. signaling traffic that is received from certain links is processed accordingly, for example on the basis of list entries,
- Subservice number and general address (global title) of the calling user of the SCCP; processing is likewise performed on the basis of list entries.

In order for signaling messages of a particular message type (e.g. SMS signaling messages) to be transferred via a first or a second data communications network, the MAP/TCAP signaling messages must be decoded by the decision device 3 prior to SCCP global title translation (analysis of the operation code); the relevant operation codes are based on the EN 300 599 and 3G TS 29.002 standards published by ETSI.

The relevant global title translator (gtTranslator, processing device), which is used for translating the global title into a destination code, then depends on the relevant message type. As a consequence, an outgoing route is selected for signaling traffic. SMS signaling messages for example are therefore transferred via an IP transmission path (second data communications network 6).

The term "selection of a processing device" is taken to mean that an object entity of a gtTranslator is formed with appropriate parameters, i.e. parameters determined by the decision device after parameter analysis. In other words, the parameters with which the global title translator and the associated rules (e.g. relevant database access) are called are defined by the decision device on the basis of source or user information.

On receipt of a signaling message ("Start") the subsystem number of the SCCP protocol of the relevant signaling message is determined. If the subsystem number is not used by the MAP, gtTranslation takes place for "non-SMS"-related messages, e.g. on the basis of one of the other criteria mentioned above.

If however the subsystem number is used by the MAP, the MAP code is decoded. This decoding shows whether the MAP contains an SMS-related message. If the MAP does not contain an SMS-related message, gtTranslation also takes place for non-SMS-related messages.

If there is no match with the above-mentioned parameters, selection of the appropriate processing device will likewise be based on a default value.

To ensure that the signaling messages are processed in accordance with the present invention it is best to use the global title translation function as defined in the Q.711 to Q.714 and Q.751.2 standards of the ITU and EN 300 009-1, T1.112.1.5, ETS 300 599 and 3G TS 29.002 standards of the ETSI.

Figure 3:
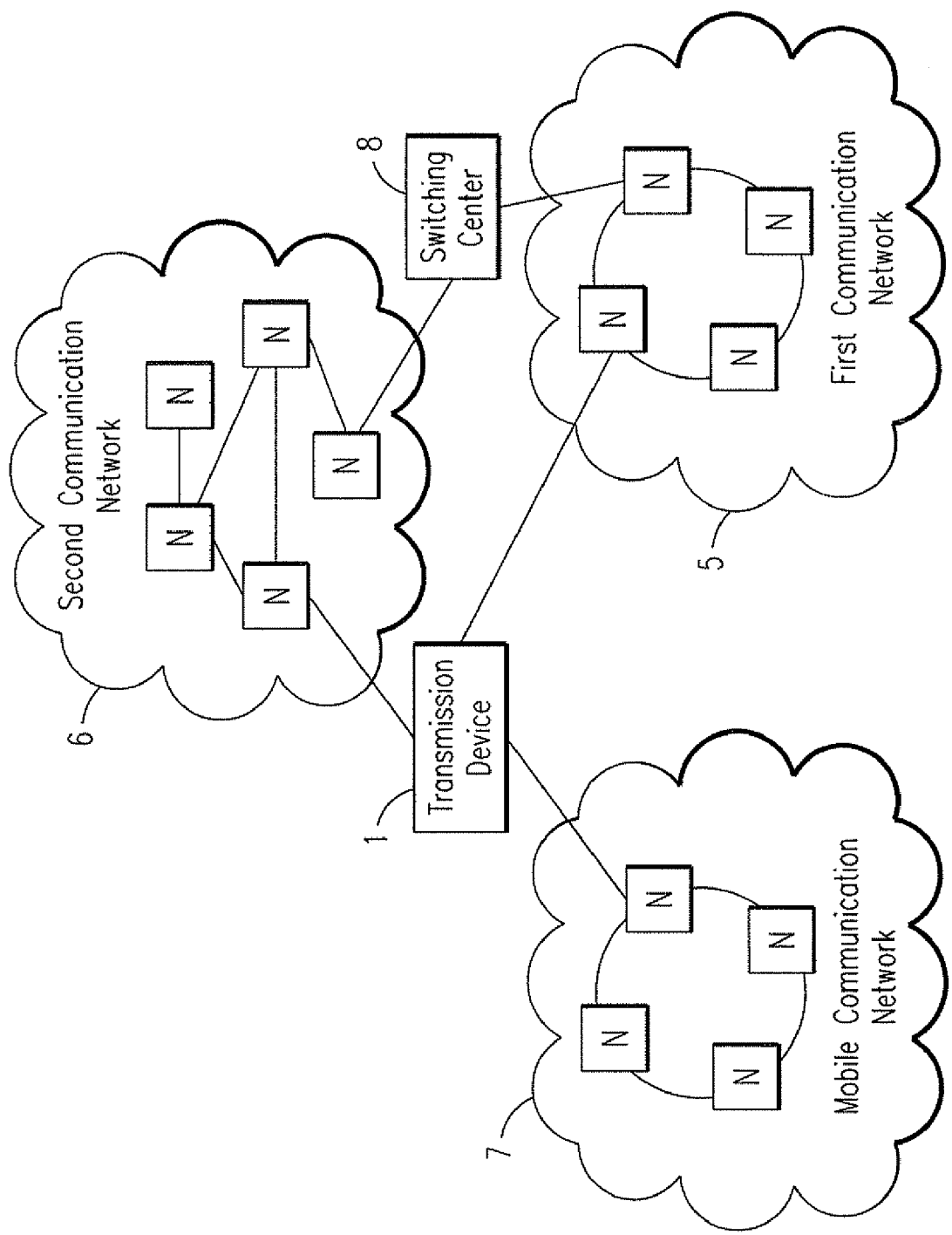
FIG. 3 shows a sample application of the present invention.

FIG. 3 shows an embodiment of the present invention.

As in FIG. 1, reference number 5 indicates the first data communications network, reference number 6 indicates the second data communications network and reference number 1 indicates the transmission device as per the invention. In addition, this Fig. shows a mobile communications network 7 and a switching center 8. Each of the data communications networks shown contains multiple switching nodes, transfer nodes, etc. for transferring and forwarding data such as user data and signaling messages.

If a signaling message is generated in the mobile communications network 7, then in accordance with prior art it is transferred via the signaling network to the appropriate destination. In accordance with this embodiment of the present invention, however, the relevant signaling message is transferred as a function of its content either via the signaling network (first data communications network 5) or via the internet (second data communications network 6).

For this purpose, a check is performed in the transmission device 1, which is implemented for example in a signaling transfer point, by the decision device as per the invention.

If for example the signaling message is an SMS-related signaling message it will be transferred in accordance with the invention via the second data communications network. If the signaling message is a signaling message that is not related to an SMS it will be transferred via the conventional signaling network.

The signaling messages that have been transferred via the second data communications network 6 are fed back into the signaling network (first data communications network 5) in the vicinity of the destination by the switching center 8.

It should be noted that the distinction between "SMS-related" and "non-SMS-related" signaling messages serves purely as an example. In accordance with the present invention, any signaling messages that do not call for a high quality of service can be transferred via the second data communications network.

A special database has to be set up for the global title translator for SMS signaling traffic, which is implemented by marking a gtTranslator object entity with an additional "reserved for SMS" flag.

All gtRoutes relating to the "reserved for SMS" gtTranslators are therefore automatically reserved.

The present invention has the advantage that the signaling network (first data communications network 5) is relieved of signaling traffic that does not require a high quality of service. The signaling network is therefore capable of handling additional signaling traffic.

Figure 4A:
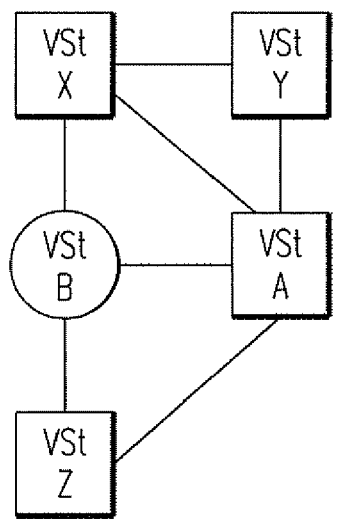
FIG. 4a shows an application according prior art.
Figure 4B:
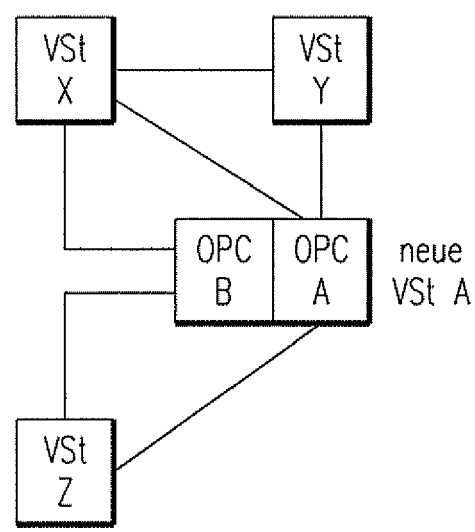
FIG. 4b shows an exemplary application of the present invention.

FIGS. 4a and 4b show a further embodiment of the present invention, with FIG. 4a showing the processing of signaling messages according to prior art and FIG. 4b showing the processing of signaling messages in accordance with the present invention.

This example shows how switching centers can be combined with the aid of the present invention.

In the example in FIG. 4a (prior art), signaling messages that are sent by one of the adjacent switching centers X or Y (VSt X, VSt Y) can be transferred either via switching center B (VSt B) or switching center A according to their destination; according to the latest state of the art, the database that is used for global title translation is network-independent.

With the aid of the present invention, switching centers A and B can be combined in a new switching center A (new VSt A), as shown in FIG. 4b. The original switching center B (VSt B) can then be dispensed with.

By selecting the appropriate processing device on the basis of the source information and/or user information contained in the signaling messages, as per the present invention, it is possible to determine in the new switching center A (new VSt A) whether the signaling message is intended for the original switching center B or the original switching center A and to carry out further processing by selecting the relevant processing device. For the adjacent switching centers X and Z the two switching centers A and B are apparently still available.

To avoid overlaps in global title translation the different processing devices preferably access different databases.

The present invention is described below with reference to FIGS. 5 through 8 and further examples.

Figure 5:
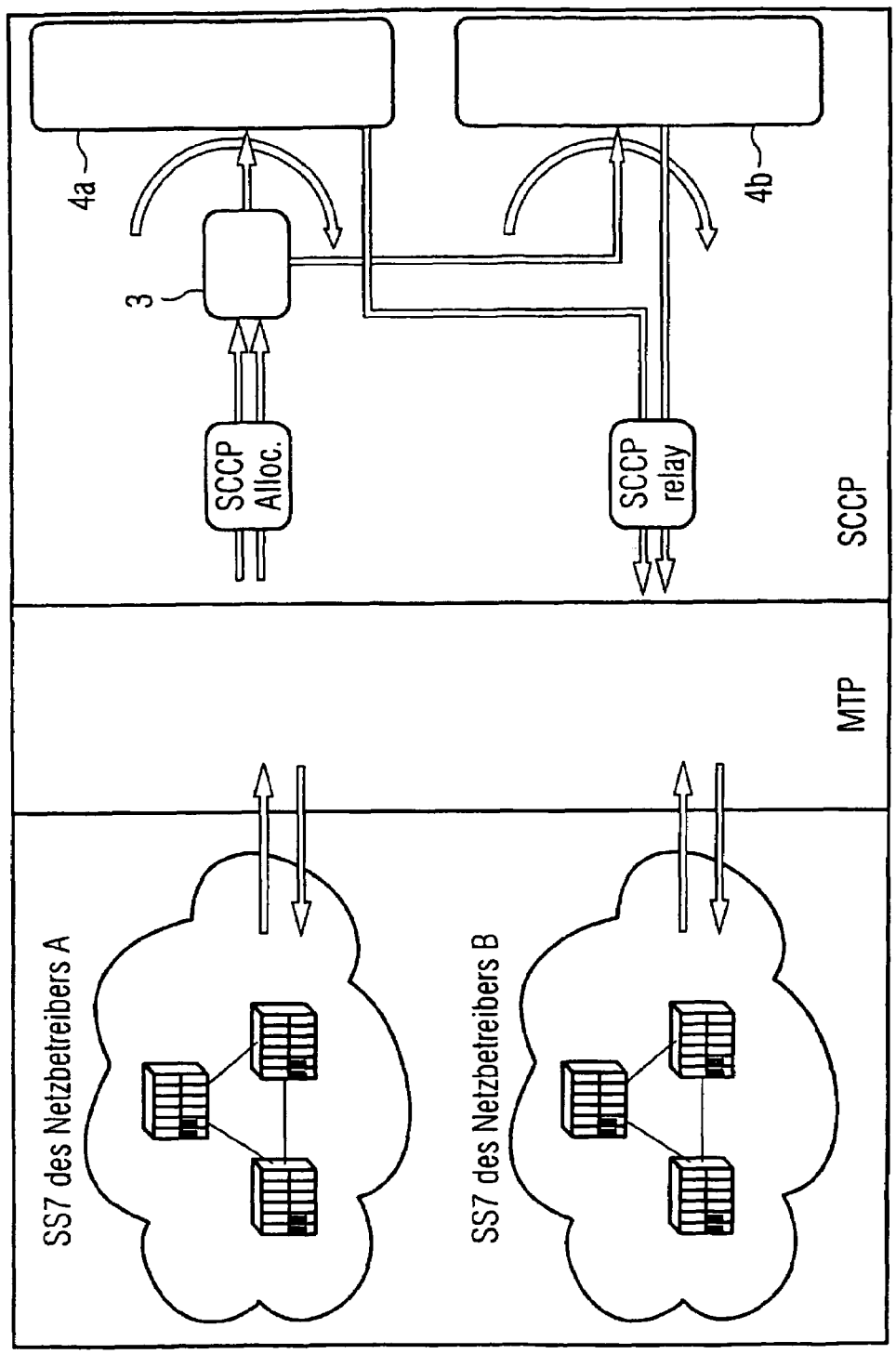
FIG. 5 shows another application of the present invention.

FIG. 5 shows the processing of signaling messages from different network operators, i.e. from the signaling networks of network operator A or B.

The SCCP information ("SCCP allocation") is read from the signaling messages transported by the message transfer part (MTP). Parameter analysis for message type, user, network operator, SMS data traffic, etc. is performed by the decision device as per the invention. After this parameter analysis the relevant processing device 4a or 4b is selected for further processing. In real terms, this means that an object entity of the global title translator is formed for further processing the signaling message, based on the results of parameter analysis. The relevant object entities differ with regard for example to the rules that are applied for global title translation (global title rules) or to the database that is accessed for global title translation.

Figure 6:
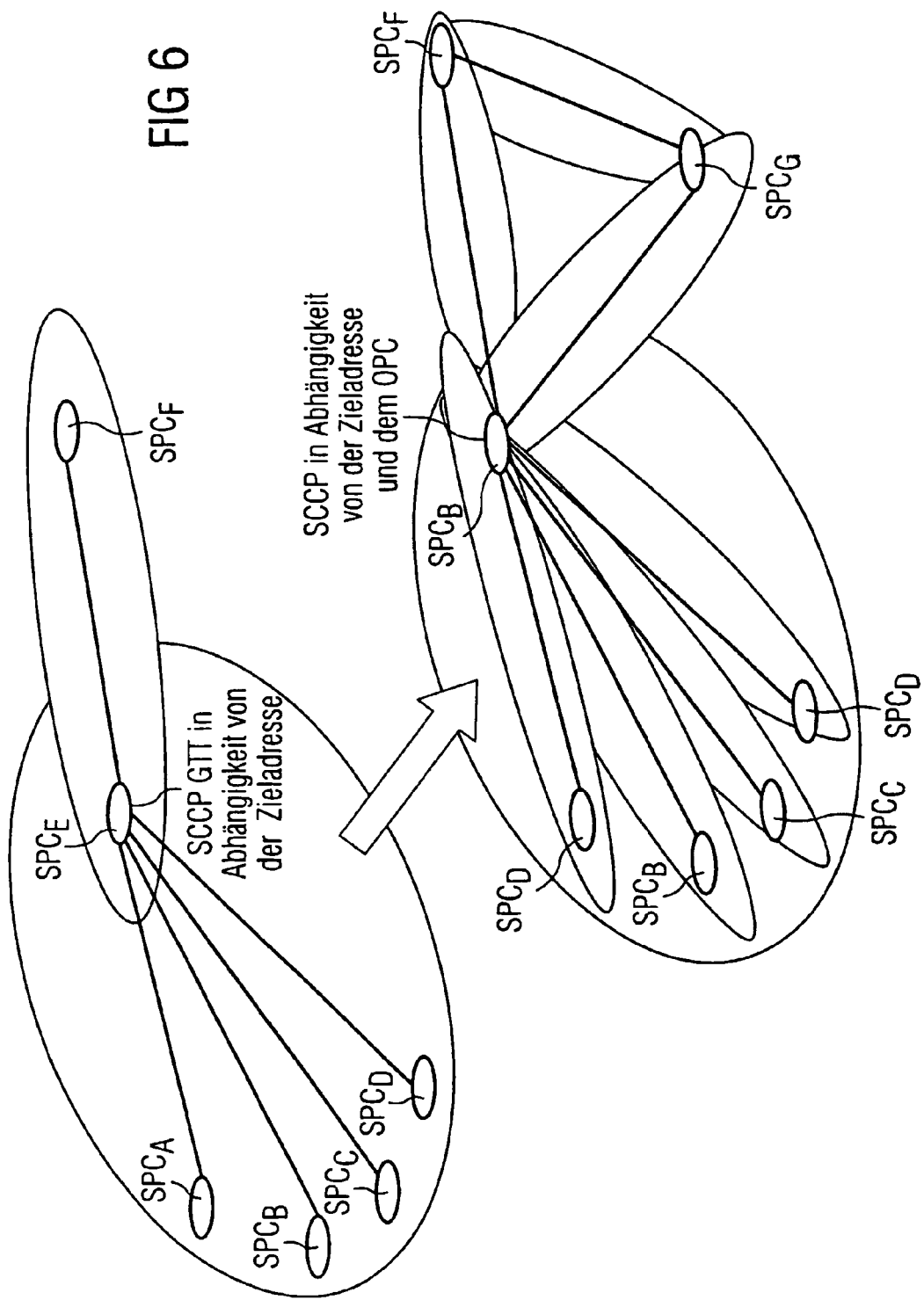
FIG. 6 shows a further exemplary application of the present invention.

FIG. 6 shows a comparison between global title translation according to prior art and global title translation according to the present invention.

According to prior art, SCCP GTT (signaling connection control part, global title translation) takes place only as a function of the destination address of the recipient of the signaling message, i.e. as a function of the called party address. This means that signaling messages that are forwarded for example from the signaling point with the address $SPC_E$ (signaling point code) and have a destination whose destination address lies in the area of the signaling point with the address $SPC_F$ are routed to the destination via a defined path irrespective of their source ($SPC_A$ to $SPC_D$).

In accordance with the present invention, SCCP GTT can now take place not only on the basis of the called party address but also as a function of the source address (calling party address) or the origination point code (OPC) of the relevant signaling message. In the example shown, this means that signaling messages that have the source $SPC_A$ are transferred from signaling point $SPC_E$ directly to destination $SPC_F$. By contrast, signaling messages with source $SPC_B$ through $SPC_D$ are routed from signaling point $SPC_E$ to the destination via signaling point $SPC_G$. This is significant for example if the transmission path via signaling point $SPC_G$ belongs to a different network operator from the one to which the direct transmission path belongs.

Signaling messages that have a different source address (called party address) but which have been forwarded from the same signaling point (not shown) to signaling point $SPC_E$ can therefore be treated differently.

Figure 7:
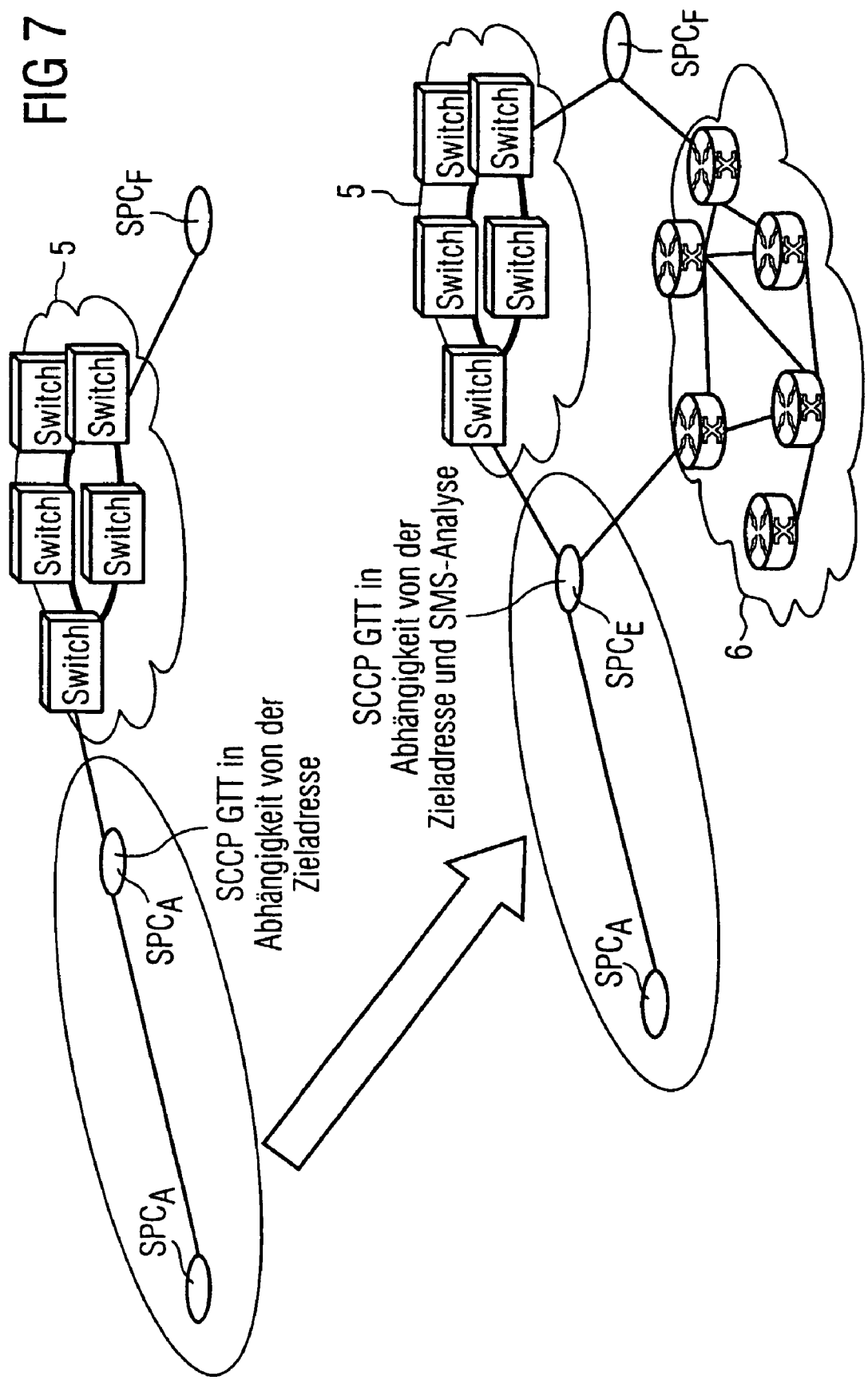
FIG. 7 shows another further exemplary application of the present invention.

FIG. 7 shows another comparison between global title translation according to prior art and global title translation according to the present invention.

For an SCCP GTT that is performed only as a function of the destination address of the signaling message, the signaling messages can be transferred to the destination in the area of $SPC_F$ only via the signaling network (first data communications network 5).

By contrast, for SCCP GTT in accordance with the present invention the data communications network via which the signaling message is transferred (first data communications network 5 or second data communications network 6) can be selected. In the example shown, an analysis of the message type also takes place in signaling point $SPC_E$, for example whether the signaling message is an SMS-related signaling message. If this is the case, data transfer to signaling point $SPC_F$ takes place via the second data communications network 6 (e.g. the internet), otherwise data transfer takes pace via the first data communications network 5 (e.g. the signaling network).

Figure 8:
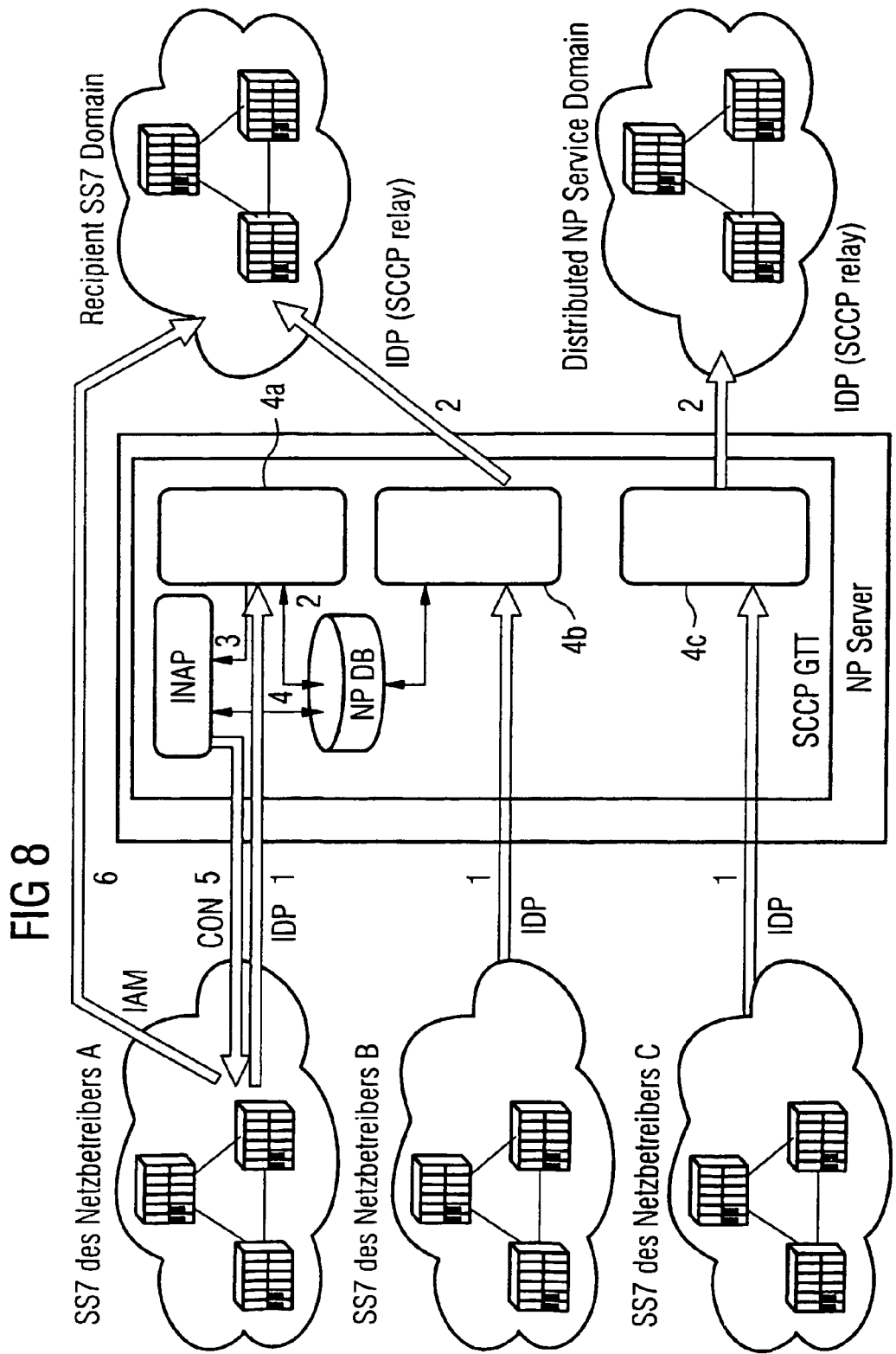
FIG. 8 shows another further exemplary application of the present invention.

FIG. 8 shows examples of the use of the present invention for ported numbers. Database access for these ported numbers can take place as a function of the relevant network operator (network operator A, B or C); processing is performed by the relevant processing device 4a, 4b or 4c.

For signaling messages that come from the signaling network (SS7) of network operator A and require processing of ported numbers a request (IDP, initial domain part) is made from the signaling network of operator A. Processing device 4a then accesses the database (NT DB, number portability database). A response to the signaling network of operator A is made via the INAP (intelligent network application part) as a connect message (CON) back to the signaling network of operator A. After this database access an initial address message (IAM) is transferred directly to the receiving signaling network (recipient SS7 domain). This procedure is also known as a handoff procedure.

In the case of signaling messages from the signaling network of operator B, signaling messages are forwarded directly to the receiving signaling network after database access.

Signaling messages of network operator C have no database access authorization and are routed to a further server that allows database access (distributed NP service domain).

The invention claimed is:

1. A system for transmitting signaling messages, comprising:
    at least a first data communications network configured to provide transfer of data there through with a first quality of service;
    at least a second data communications network configured to provide transfer of data there through with a second quality of service, wherein the first quality of service is different relative to the second quality of service;
    a receiving interface for receiving signaling messages;
    a plurality of processing devices for processing the received signaling messages, the plurality of processing devices coupled to said at least first and second communications networks; and
    a decision device which selects a processing device for further processing the signaling messages on the basis of the source information and/or user information contained in the signaling messages, wherein the selected processing device transfers the received signaling messages to a selected one of said at least first and second communications networks to be transferred with a quality service corresponding to the quality of service of the selected one of said at least first and second communication networks, thus transferring the received signal messages through a network with a quality of service appropriate for the received signaling messages.

2. A system according to claim 1, wherein the decision device selects the relevant processing device on the basis of the source address of the signaling message.

3. A system according to claim 2, wherein the decision device selects the relevant processing device on the basis of the user of the signaling message.

4. A system according to claim 2, wherein the decision selects the relevant processing device on the basis of the message type of the signaling message.

5. A system according to claim 2, wherein the processing device performs routing of the signaling message.

6. A system according to claim 2, wherein billing for the signaling messages depends on the processing device selected.

7. A system according to claim 1 wherein the decision device selects the relevant processing device on the basis of the user of the signaling message.

8. A system according to claim 7, wherein the decision selects the relevant processing device on the basis of the message type of the signaling message.

9. A system according to claim 7, wherein the processing device performs routing of the signaling message.

10. A system according to claim 1, wherein the decision device selects the relevant processing device on the basis of the message type of the signaling message.

11. A system according to claim 10, wherein the processing device performs routing of the signaling message.

12. A system according to claim 1, wherein the processing device performs routing of the signaling message.

13. A system according to claim 1, wherein the first data communications network is a signaling network.

14. A system according to claim 13, wherein the second data communications network is an IP-based data communications network.

15. A system according to claim 1, wherein the second data communications network is an IP-based data communications network.

16. A system according to claim 1, wherein the decision device for signaling messages whose message type relates to SMS data transmissions selects a processing device that transfers signaling messages via the second data communications network.

17. A system according to claim 1, wherein billing for the signaling messages depends on the processing device selected.

* * * * *